May 25, 1937.  C. H. HAPGOOD  2,081,432
MILK HEATER
Filed Aug. 6, 1936  2 Sheets-Sheet 1

WITNESS:
INVENTOR
Cyrus Howard Hapgood
BY
Busser and Harding
ATTORNEYS.

May 25, 1937.                C. H. HAPGOOD                2,081,432
                              MILK HEATER
                          Filed Aug. 6, 1936        2 Sheets-Sheet 2

WITNESS:

INVENTOR
Cyrus Howard Hapgood
BY
ATTORNEYS

Patented May 25, 1937

2,081,432

UNITED STATES PATENT OFFICE 2,081,432

MILK HEATER

Cyrus Howard Hapgood, Nutley, N. J., assignor to The De Laval Company, Limited, Peterborough, Ontario, Canada, a corporation of Canada Application August 6, 1936, Serial No. 94,500

3 Claims. (Cl. 257—64)

My invention relates to that known type of liquid heater, especially intended for the heating of milk, which comprises a long and narrow tank in which are arranged one or more coils of tubes, the tubes of a coil extending lengthwise of the tank and being arranged one above another in the same vertical plane and being connected at the ends by headers that provide a closed path for the flow of the milk under pressure through the coil or coils. In such heaters the milk is heated by fluid flowing through the tank.

Such heaters may be used to heat the milk through a comparatively small temperature range, say from 40° F. to 80–85° F., preparatory to centrifuging, or to a substantially higher temperature, say 145° F., for pasteurizing.

The object of my invention is to provide a heater by means of which the milk may be heated by a fluid, preferably water, but little hotter than the temperature to which it is desired to raise the milk and also so to circulate the heating fluid as to avoid local overheating but nevertheless at the same time raise the temperature of the milk as rapidly as possible consistent with the comparatively low temperature of the heating fluid. To this end I provide means to insure the circulation of the heating liquid in a novel manner through the tank.

A preferred embodiment of the invention is shown in the drawings, in which—

The heating fluid, which will ordinarily be hot water, is adapted to circulate within a tank $a$, which is narrow relative to its length and height. It need be of a width only sufficient to accommodate a single series of tubes, 1 to 8, arranged one above another, through which and end headers (hereinafter described) the milk or other liquid to be heated is adapted to flow, the milk being admitted, preferably, into pipe 1 and discharged from pipe 8, the inlet and outlet being at the same side of the tank.

In the bottom of the tank, midway between its end walls, is positioned a chamber $c$ having double flared outlet openings $d, d$, extending toward opposite ends of the tank and an inlet opening $e$ at its top. Within the chamber $c$ is a small tubular chamber $f$ having an opening $g$ in its side for connection with a steam pipe, and end nozzles $h, h$, directed toward opposite ends of the tank, the nozzles $h, h$ with the double flared end openings $d, d$ of the chamber $c$ acting as injectors to force water, admitted to chamber $c$ through its top opening $e$, lengthwise of the tank toward opposite ends thereof, as indicated by the arrows.

The interior of the tank is equipped with a number of guides or baffles $i$, which compel the water to circulate, in two streams on opposite sides of the central part of the tank, at successively higher levels in successively opposite directions longitudinally of the tubes, the water being prevented, by the baffles or partitions $k$, from reaching the central portion of the tank until after it rises above the upper pipe of the series, above and along which it flows to the center of the tank and thence down between partitions $k$ to the chamber $c$ into which it is drawn and from which it is again forcibly discharged by the injector action of the steam from the nozzles $h, h$.

The steam supplied to the water, as above described, reheats the water. As the volume of water increases due to condensation of steam, the excess is discharged through the overflow pipe $m$.

Figure 1:
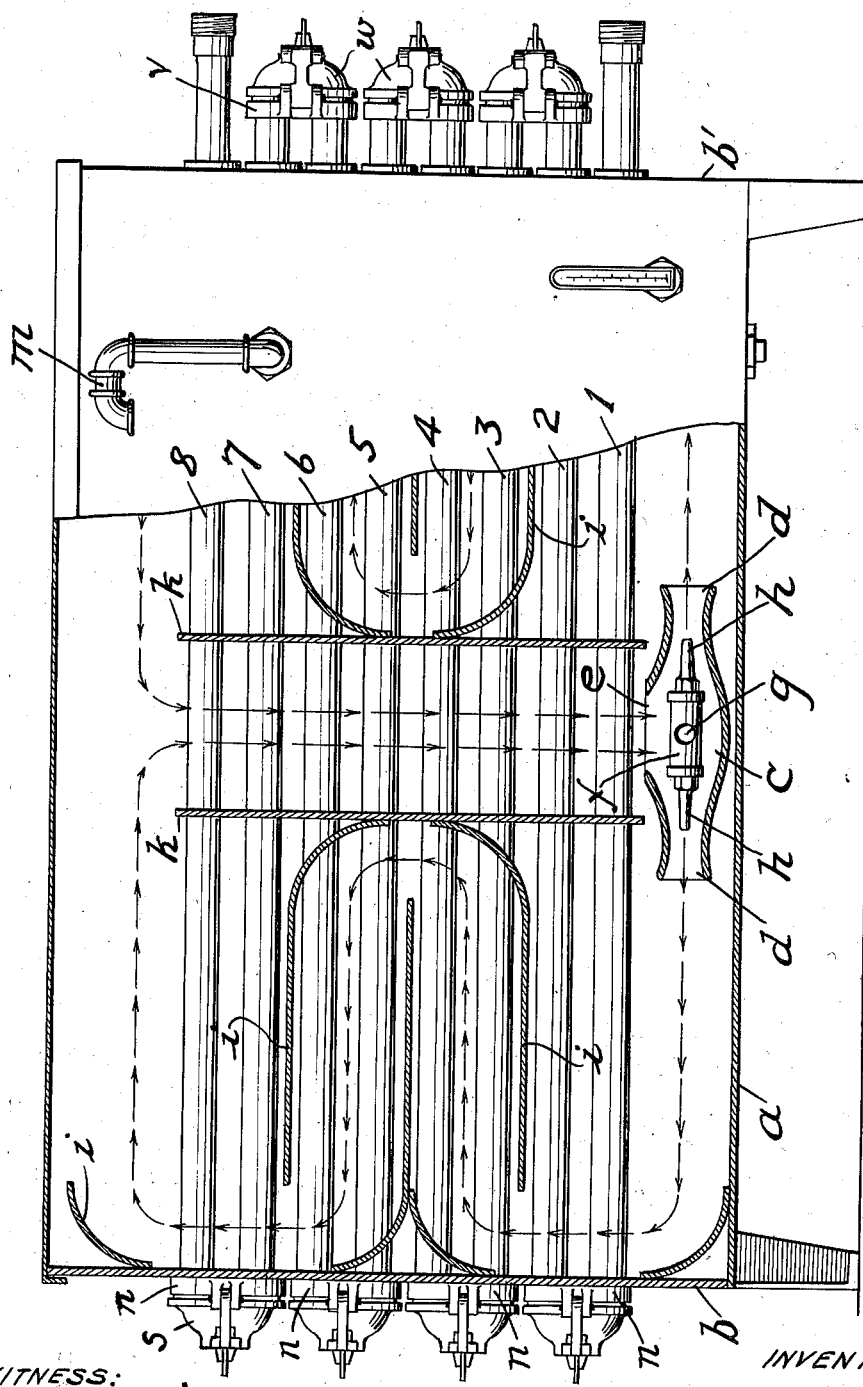
Fig. 1 is a side elevation, mostly in section, of the complete heater.
Figure 2:
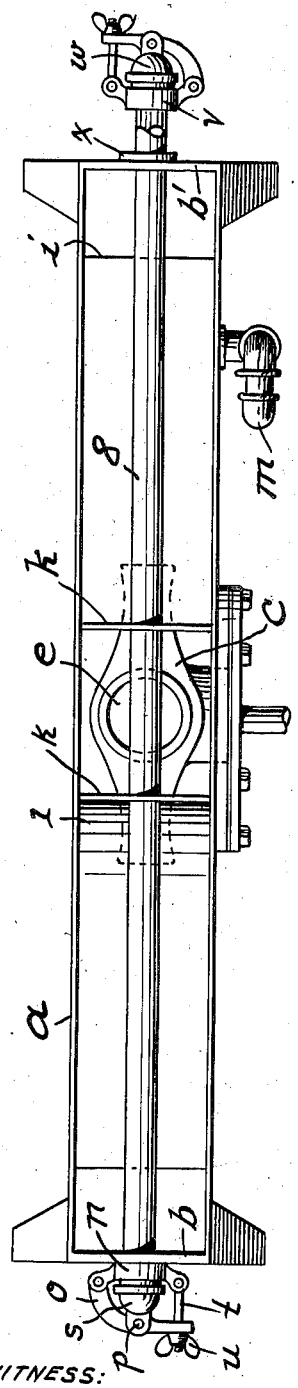
Fig. 2 is a top view of the heater partly in section.
Figure 3:
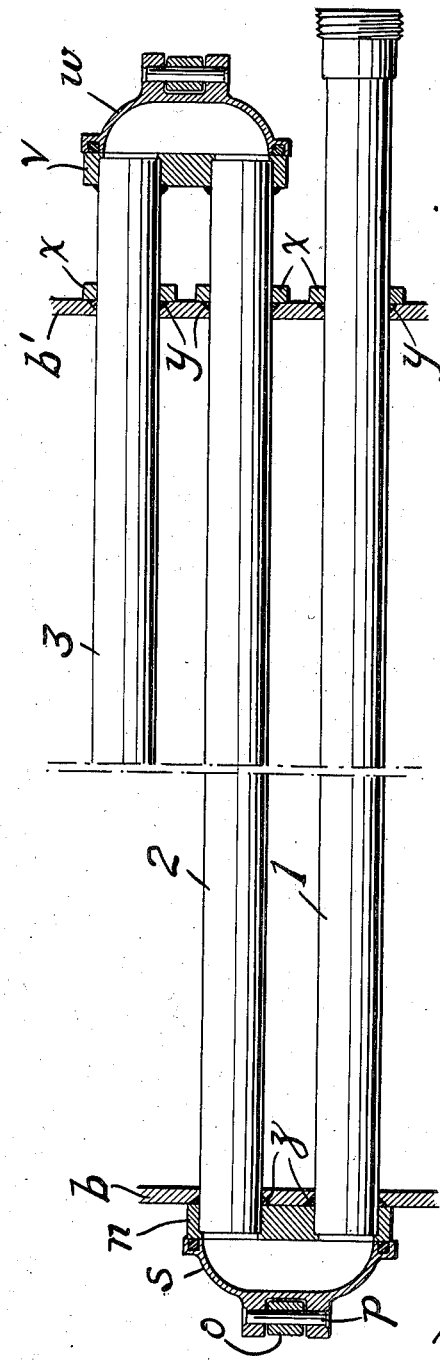
Fig. 3 is a detail sectional view showing the tubes and their end connections.

Applied to one of the end walls $b, b'$ of the tank (the left hand wall in Fig. 1) are a series of blocks $n, n, n, n$, each block having two holes aligning with holes in the tank wall and adapted to receive the ends of two adjacent tubes, the tubes being fixedly or permanently secured in the holes by soldering, brazing or otherwise; one block being arranged to thus receive the ends of tubes 1 and 2, another block the ends of tubes 3 and 4, and so on. Each of these blocks is secured to the tank wall.

Pivotally secured to each block $n$ is a lever $o$ through which, between its ends, extends a pin $p$, from which is suspended a cap $s$. Also pivotally secured to each block $n$ is a rod $t$ which extends loosely through the end of lever $o$. Each cap $s$ is adapted to be swung into and out of position to seat upon the corresponding block and is held in place thereon by means of a thumb-nut $u$ on the rod $t$. The caps $s$ constitute the headers which afford communication between the corresponding ends of adjacent pipes 1 and 2, 3 and 4, etc.

The other ends of the tubes 1–8 project through holes in the other end wall $b'$ of the tank and extend beyond such wall. The ends of tubes 1 and 8 are adapted for connection respectively to the supply and discharge pipes (not shown) for the milk or other liquid to be heated. The ends of tubes 2 to 7 inclusive are connected in pairs, 2 and 3, 4 and 5, 6 and 7, to blocks $v, v, v$. The blocks $v$ may be identical in structure with blocks

*n*, and the ends of the tubes engaging blocks *v* are fixedly or permanently secured thereto in the same way as the other ends of the tubes are secured to blocks *n*. Caps *w*, constituting headers affording communication between the ends of pairs of tubes 2 and 3, etc., are applied to blocks *v* and may be pivotally mounted thereon in the same way that the headers *s* are mounted on the blocks *n*. Flanges *x*, bolted to the right hand end wall, and packing rings *y*, seal the openings through which the right hand ends of the tubes project. Similar ring packing *z* seals the openings in the wall *b* through which the left hand ends of the tubes project into the blocks *n*.

Access to the tubes for cleaning may be obtained by removing the thumb-nuts *u* and swinging out the corresponding headers.

It will be understood that the number of tubes of a series may be varied as desired. More than one series of tubes may be substituted for a single series. Such a modification would be substantially a duplication of the construction described and therefore need not be illustrated.

By means of the foregoing construction the circulation of the water is such that the flowing stream is brought into heat exchange relation with the entire body of milk that may be at any time flowing through the tubes. By heating the water at about the center of the length of the tank and dividing it into two streams and causing these streams to flow in respectively opposite directions through the two halves of the tank the length of the flowing stream is reduced one half so that the time of flow is not so prolonged as to cause the water to lose its excess heat before it has completed a circuit. In other words I provide for heat exchange between the water and all parts of the milk while still providing for an efficiently short time interval between successive applications of heat to any part of the circulating water stream.

What I claim and desire to protect by Letters Patent is:

1. A milk heater comprising a tank, narrow relative to its length and height, adapted to contain a heating fluid, a series of horizontally disposed tubes within the tank arranged one above another, end headers connecting adjacent tubes to provide a continuous flow passage for liquid to be heated through the tubes successively, means in the bottom part of the tank to force the heating fluid to flow laterally in the direction of extension of the tubes, and baffles in the tank to compel the liquid to flow at successively higher levels in successively opposite directions longitudinally of the tubes and thence downward.

2. A milk heater comprising a tank, narrow relative to its length and height, adapted to contain a heating fluid, a series of horizontally extending tubes arranged within the tank one above another, end headers connecting adjacent tubes to provide, through the tubes successively, a continuous flow passage for the liquid to be heated, means in the tank to force the heating fluid to flow from about midway of the tank in opposite directions parallel to the tubes toward opposite ends of the tank in heat exchange relation with one or more tubes and thence to flow in opposite directions parallel to the tubes toward the central part of the tank in heat exchange relation with one or more other tubes and thence complete the circuit.

3. A milk heater comprising a tank, narrow relative to its length and height, adapted to contain a heating fluid, a series of horizontally extending tubes arranged within the tank one above another, end headers connecting adjacent tubes to provide, through the tubes successively, a continuous flow passage for the liquid to be heated, means in the bottom part of the tank about midway of its length to force the heating fluid to flow through the lower part of the tank in opposite directions parallel to the tubes toward opposite ends of the tank, and baffles in the tank to compel the liquid to flow, in two streams on opposite sides of its central portion, parallel to the tubes at successively higher levels in successively opposite directions and then downward through the central part of the tank.

CYRUS HOWARD HAPGOOD.